US006311798B1

United States Patent
Anderson

(12) United States Patent
(10) Patent No.: US 6,311,798 B1
(45) Date of Patent: Nov. 6, 2001

(54) SNOWMOBILE WITH ADJUSTABLE WIDTH FRONT SUSPENSION

(75) Inventor: Jake Anderson, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 09/444,011

(22) Filed: Nov. 19, 1999

(51) Int. Cl.$^7$ ................................................. B62M 27/02
(52) U.S. Cl. ........................ 180/182; 180/190; 280/16; 280/86.757
(58) Field of Search ........................ 180/186, 190, 180/182, 906; 280/267, 86.757, 16, 21.1, 93.51, 93.502, 124.103, 86.751

(56) References Cited

U.S. PATENT DOCUMENTS

| 1,417,320 | * | 5/1922 | Hatcher et al. . |
| 1,705,578 | | 3/1929 | Lichtenberg . |
| 2,173,419 | | 9/1939 | Johnson ................................. 280/80 |
| 2,750,199 | | 6/1956 | Hart ........................................ 280/93 |
| 3,605,926 | | 9/1971 | Leonawicz ............................ 180/5 R |
| 3,933,213 | | 1/1976 | Trowbridge ........................... 180/5 R |
| 4,359,123 | | 11/1982 | Haupt et al. .......................... 180/159 |
| 4,373,743 | * | 2/1983 | Parsons, Jr. .......................... 280/661 |
| 4,422,666 | * | 12/1983 | Proctor .................................. 280/694 |
| 4,671,521 | * | 6/1987 | Talbot et al. ........................... 280/16 |
| 5,121,808 | | 6/1992 | Visentini et al. ..................... 180/155 |
| 5,660,245 | * | 8/1997 | Marier et al. ......................... 180/190 |
| 6,009,966 | * | 1/2000 | Olson et al. .......................... 180/182 |

FOREIGN PATENT DOCUMENTS 1227823    10/1987   (CA) ..................................... 305/38

* cited by examiner

Primary Examiner—Brian L. Johnson
Assistant Examiner—Avrhaham H. Lerner
(74) Attorney, Agent, or Firm—Fredrikson & Byron, P.A.

(57) ABSTRACT

A snowmobile having an adjustable width front suspension. The snowmobile has a chassis and front skis spaced laterally from each other. For at least one of the skis, a mounting column extends generally upward and parallel radius rods, which may be of adjustable length, are pivotally connected between the chassis and the mounting column. The lateral spacing of the front skis may be adjusted by adjusting the length of the radius rods or by adjusting the lateral position on which the radius rods mount to the chassis or the mounting column.

11 Claims, 8 Drawing Sheets

SNOWMOBILE WITH ADJUSTABLE WIDTH FRONT SUSPENSION

FIELD OF THE INVENTION

The present invention relates to snowmobiles, and in particular, to snowmobiles having an improved front suspension.

BACKGROUND OF THE INVENTION

A variety of snowmobile ski suspension systems have been employed on snowmobiles over the years. In the early 1980's the assignee of the present invention introduced to the snowmobiling industry an independent front suspension system utilizing a trailing arm—ie., an elongated arm having its front end connected to the steering spindle, and the rear end pivotably connected to the chassis (see, e.g., Canadian Pat. No. 1,227,823, the contents of which are hereby incorporated by reference). The trailing arm is oriented generally parallel to the snowmobile's longitudinal centerline and generally parallel to the ground. The pivotal connection of the rear end of the trailing arm to the chassis is provided to permit the front end of the arm to move upwardly and downwardly as the ski encounters uneven terrain.

Snowmobiles used for trail riding are sold with relatively wider suspensions (as measured by the distance between the front skis or 'ski stance'). Such wider suspensions generally provide greater comfort and stability. In contrast, snowmobiles used for racing, off-trail use, mountain climbing, etc. are sold with relatively narrower suspensions. Such narrower suspensions in general allow a rider to lean into turns better. Riders must therefore choose at the time of purchase what type of snowmobile (and corresponding ski stance) will be best suited for their intended type of use. Once a snowmobile is purchased, its rider may be forced to use the snowmobile on terrain other than that which the snowmobile's front suspension is best suited.

In addition, other factors may influence snowmobile purchasers' choice of ski stance. For instance, snowmobile trails may be groomed (likely by previous riders' tracks) at the width associated with the most common ski stances. A snowmobile rider following such a groomed trail with an uncommon ski stance (either wider or narrower) will not be able to keep both of the snowmobile's skis in the groomed tracks. Instead, the snowmobile will likely fall in and out of the groomed tracks or drift from one ski track to the other, creating a rougher ride. Another factor that may influence snowmobile purchasers' choice of ski stance relates to possible jurisdictional regulation of ski stances. Certain countries regulate snowmobile ski stances, requiring them to be of a particular width. A snowmobile purchaser who may be riding the snowmobile in any such country must account for that country's ski stance regulations. Accordingly, several factors limit snowmobile purchasers' freedom to choose any available snowmobile and its corresponding suspension.

SUMMARY OF THE INVENTION

The present invention provides a snowmobile having a front suspension of adjustable width. With adjustable width, the suspension may be adjusted relatively wider for snowmobile riding such as on trails or other flat-terrain. The suspension may also be adjusted relatively narrower such as that which may be best suited for off-trail use, mounting climbing, etc. The flexibility permits the suspension to be adjusted to match a particular trail's pre-groomed tracks or a particular country's required ski stance. The adjustable suspension may permit the adjustment of only the left ski, only the right ski, or both the left and right skis.

A preferred embodiment of the snowmobile has a chassis and has left and right front skis spaced laterally from each other. A mounting column extends generally upwardly from at least one of the skis. An upper and a lower radius rod, which are generally parallel to each other, are each pivotally connected between the chassis and the mounting column.

In one embodiment, the radius rods may be of adjustable length. The lateral spacing of the front skis can be adjusted based on the adjustable length of the radius rods.

In another preferred embodiment, the upper and lower radius rods are pivotally connected at their outboard ends to respective upper and lower mounting points on the mounting column. The chassis has an upper and a lower set of rod mounting points, where the rod mounting points in each set are laterally spaced from each other. The upper radius rod is removably pivotally attached at its inboard end to any selected mounting point in the upper set of mounting points on the chassis. The lower radius is removably pivotally attached at its inboard end to any selected mounting point in the lower set of mounting points on the chassis. The lateral spacing of the front skis can be adjusted based on which mounting points in the upper and lower sets of laterally spaced mounting points on the chassis are the selected mounting points.

In yet another preferred embodiment, the upper and lower radius rods are pivotally connected at their inboard ends to respective upper and lower mounting points on the chassis. The mounting column has an upper and a lower set of rod mounting points, where the rod mounting points in each set are laterally spaced from each other. The upper radius rod is removably pivotally attached at its outboard end to any selected mounting point in the upper set of mounting points on the mounting column. The lower radius rod is removably pivotally attached at its outboard end to any selected mounting point in the lower set of mounting points on the mounting column. The lateral spacing of the front skis can be adjusted based on which mounting points in the upper and lower sets of laterally spaced mounting points on the mounting column are the selected mounting points.

DETAILED DESCRIPTION OF THE INVENTION

Figure 1:
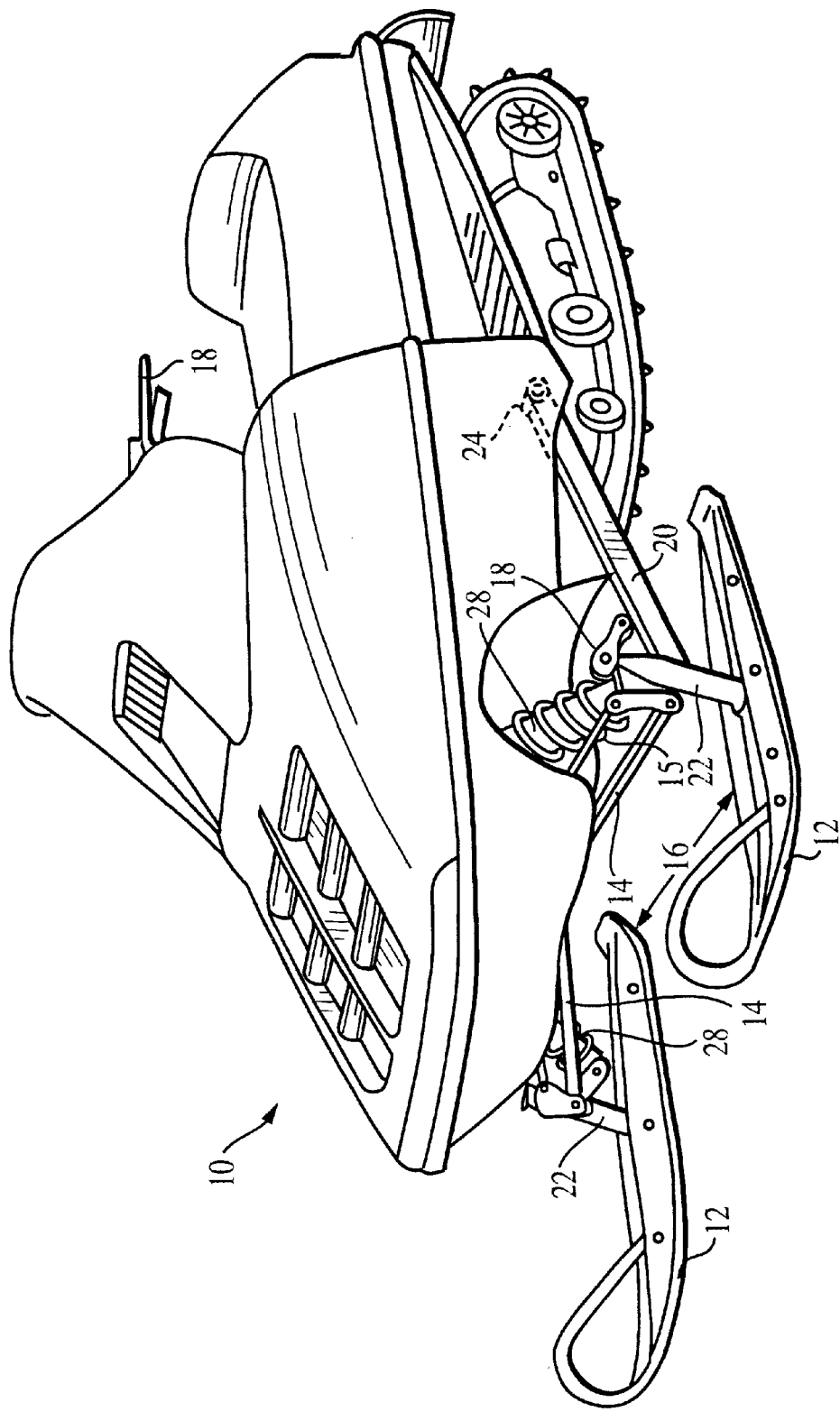
FIG. 1 is a perspective view of a snowmobile incorporating the front suspension of the invention.

The drawings depict a preferred embodiment of a snowmobile incorporating the adjustable width front suspension system of the invention. It will be understood, however, that many of the specific details of the snowmobile with an adjustable width front suspension system illustrated in the drawings could be changed or modified by one of ordinary skill in the art without departing significantly from the spirit of the invention.

Figure 2:
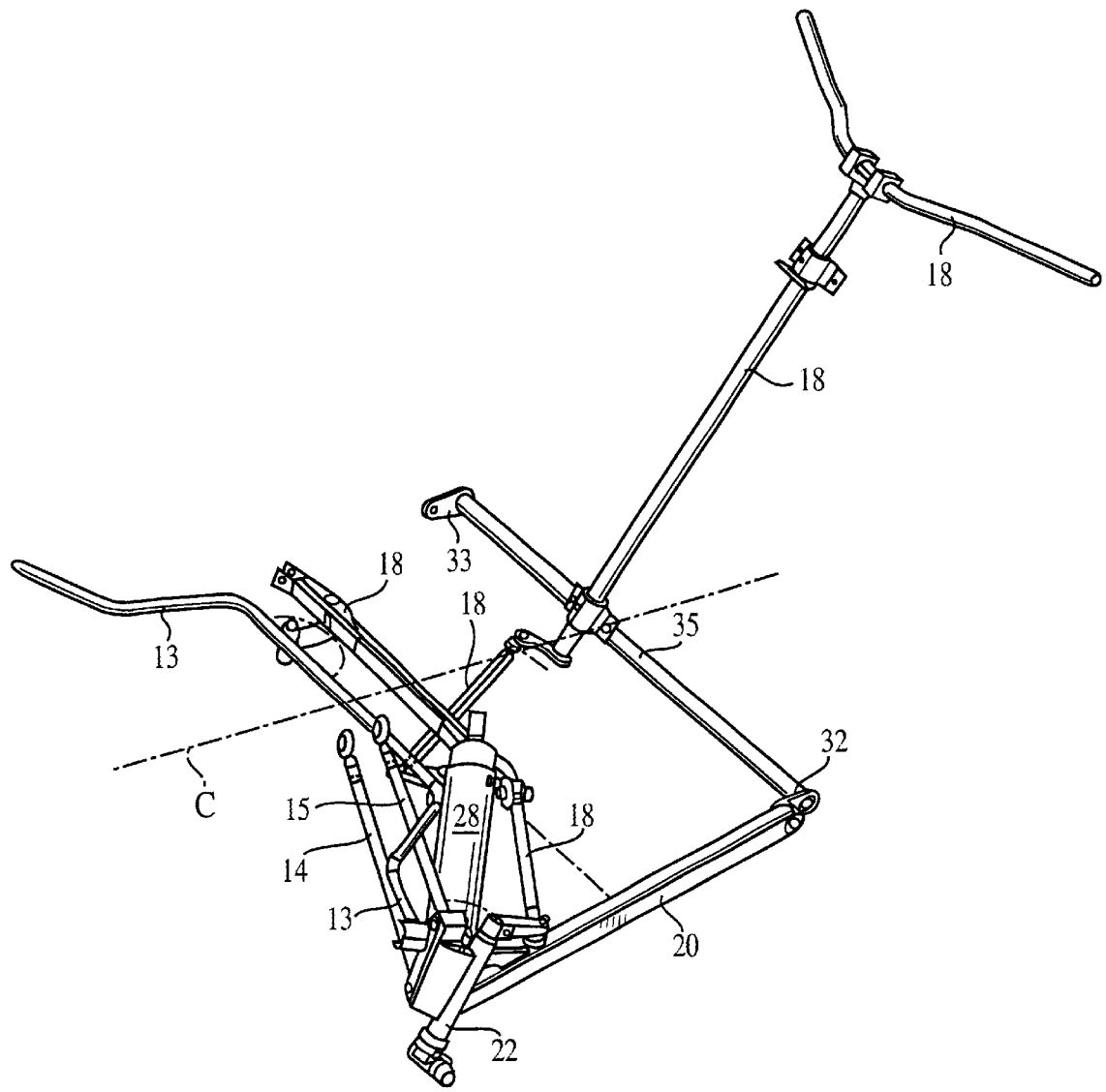
FIG. 2 is a perspective view illustrating the components of the front suspension of the invention.
Figure 3:
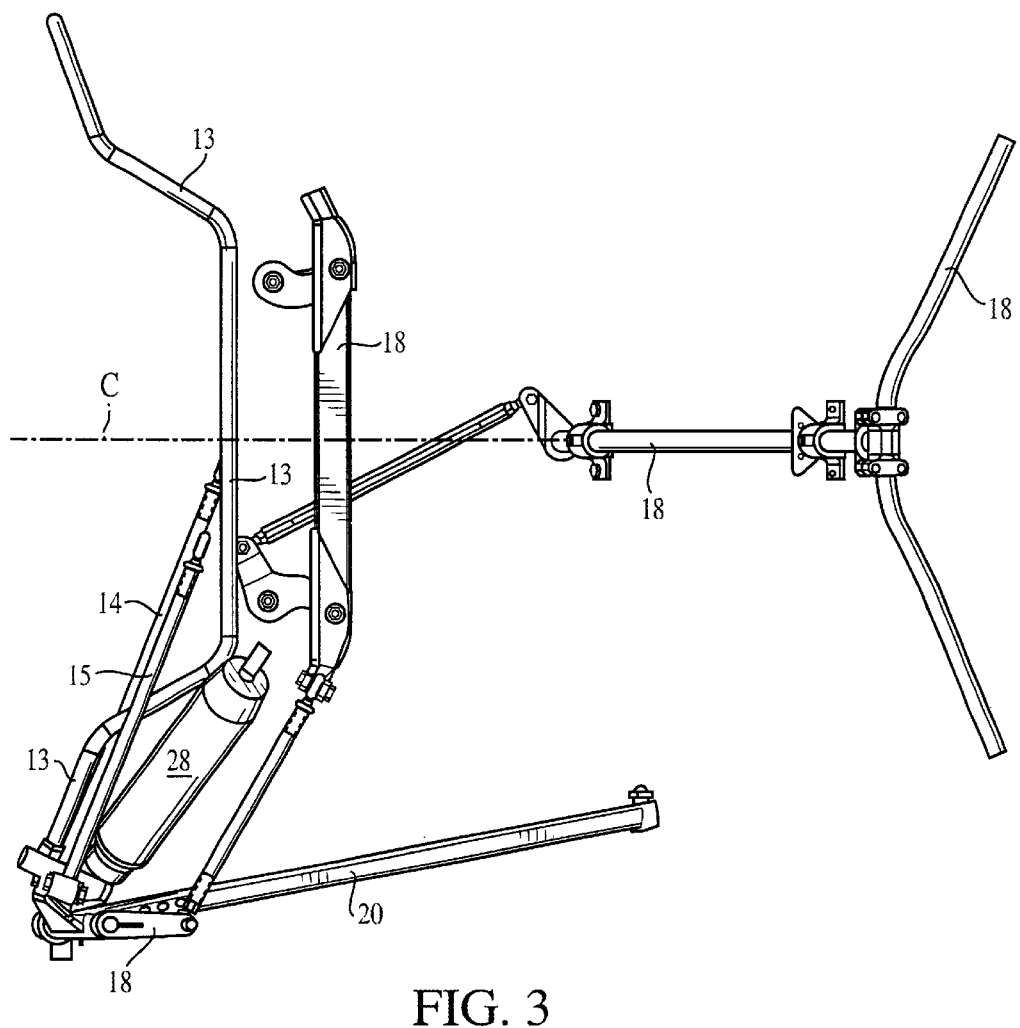
FIG. 3 is a top view of the front suspension system shown in FIG. 2.

FIG. 1 depicts generally a snowmobile having a front suspension of the invention, and FIGS. 2–3 provide further details regarding the components of the suspension. The chassis 10 of the snowmobile (concealed by body panels and other snowmobile components in FIG. 1) provides a basic framework to which the various components of the suspension system, including left and right front skis 12, of the invention may be mounted. Mounted to opposite sides of the front suspension, the skis 12 have laterally spacing 16. As indicated above, the suspension system is generally considered to be an independent suspension system, since the left and right skis are permitted to move upwardly and downwardly generally independently of each other. In many cases, however, it is desirable to connect the two sides through a torsion bar 13, as is described in detail in the Canadian patent identified above. Thus, each side of the suspension system may be a mirror image of the other, and the following discussion of the system will be with reference to the left side of the system, as shown in detail in FIGS. 2–7.

With reference to FIGS. 1–3, the ski 12 is secured to an upwardly extending spindle. The spindle in turn is rotatably disposed within (and, in the drawings, concealed by) a generally cylindrical sleeve or mounting column 22 carried at the front end of the trailing arm 20. The spindle is rotated by a steering linkage system (various components of which are identified by the common reference number 18 in the drawings) to cause the ski to turn in the desired direction.

The front end of the trailing arm 20 is linked to the chassis 10 by a pair of radius rods 14 and 15 which are oriented generally transversely to the centerline "C" of the snowmobile. The radius rods have pivotable joints on each end to permit the front end of the trailing arm 20 to move upward and downward. The rear end 24 of the trailing arm 20 is also pivotably mounted to the chassis in such a fashion as to permit the front end of the trailing arm 20 to move upward and downward. The combination of the radius rods 14 and the trailing arm 20 thus provide a geometrically stable mounting structure for the ski 12. A suitable shock absorber 28 and coil spring typically is connected from the front end of the trailing arm 20 to the chassis 10 to provide the suspension with the desired suspension characteristics.

Figure 4:
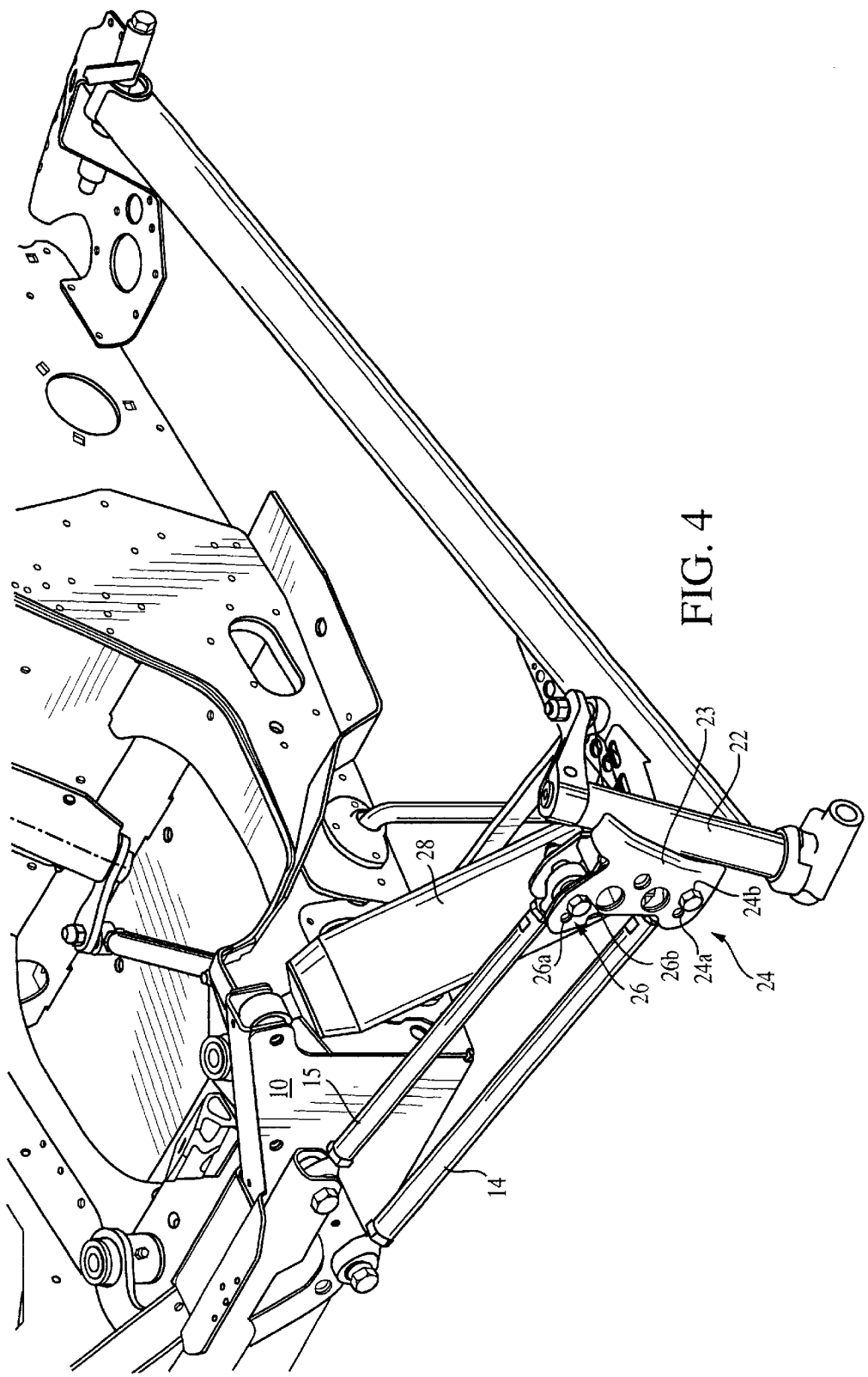
FIG. 4 is a perspective view of one embodiment of the front suspension of the invention adjusted to a relatively narrower width.

Several different front suspension structures may be used to adjust the lateral spacing 16 of the front skis 12. In one preferred embodiment of the front suspension of the invention, diagrammed in FIG. 4, the lateral spacing between the front skis 12 is adjusted to a relatively narrower width. As shown in FIG. 4, the mounting column 22, which preferably has a mounting bracket 23, has several mounting holes for pivotally mounting the radius rods 14 and 15. In particular, the mounting column 22 has a series 24 of two laterally spaced mounting holes 24a and 24b for pivotally mounting the lower radius rod 14. In addition, the mounting column 22 has a series 26 of two laterally spaced mounting holes 26a and 26b for pivotally mounting the upper radius rod 15. With the radius rods 14 and 15 mounted to the outer mounting holes 24b and 26b, respectively, the suspension is adjusted to its relatively narrower width. To widen the ski stance, the bolts through the mounting column 22 and the radius rods 14 and 15 may be removed from holes 24b and 26b, respectively, and the mounting column 22 may be shifted laterally outward. The bolts may then be reconnected through holes 24a and 26a and the radius rods 14 and 15, respectively.

Figure 5:
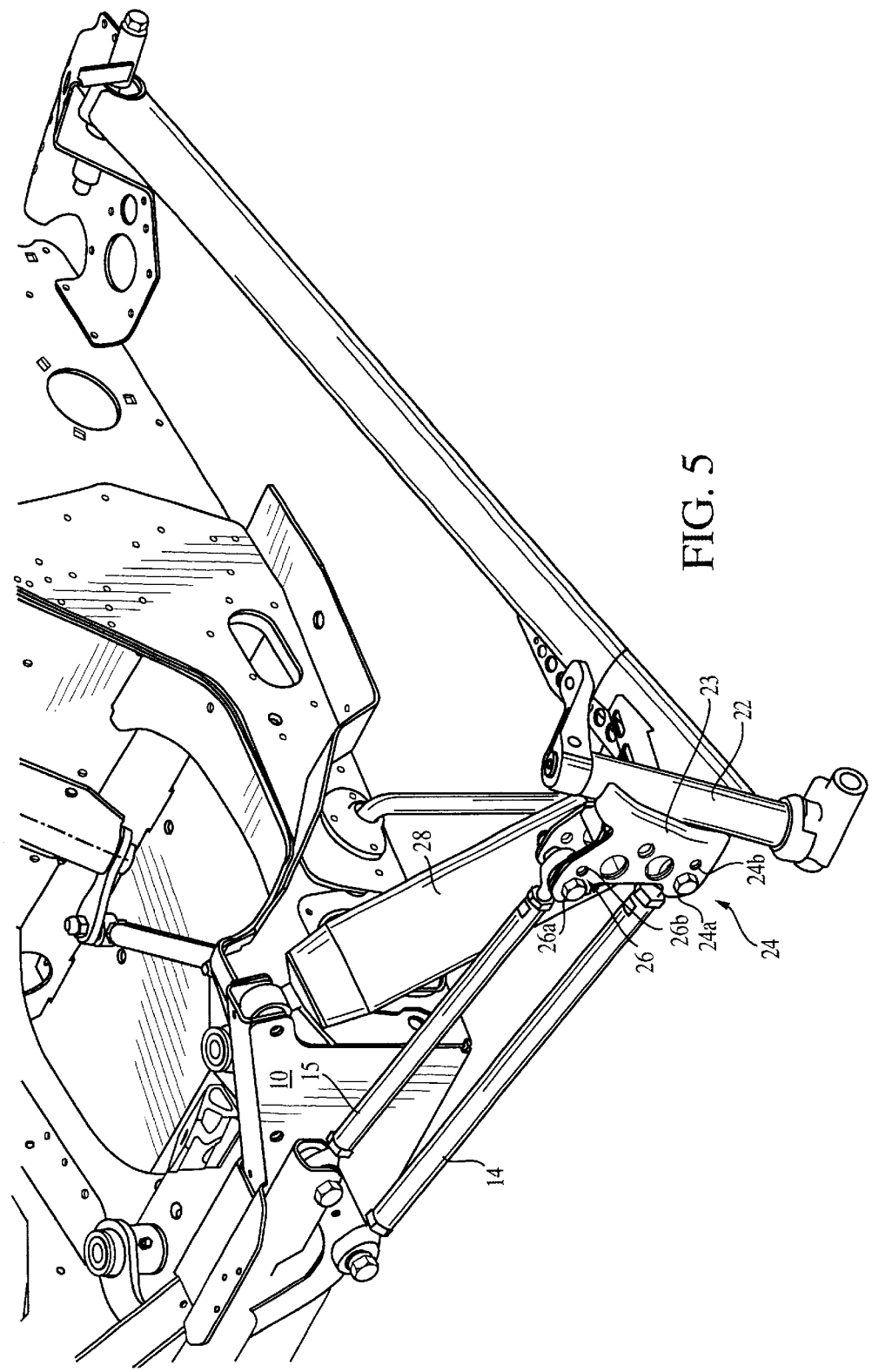
FIG. 5 is a perspective view of the front suspension shown in FIG. 4 adjusted to a relatively wider width.

FIG. 5 shows the embodiment of FIG. 4 where the suspension is adjusted to this relatively wider position. The center on center spacing between the holes 24a and 24b and between holes 26a and 26b may be ¾" or any other suitable distance. Accordingly, when the front suspension is adjusted towards its relatively wider width (as shown in FIG. 5), the ski stance 16 is adjusted ¾" wider if only the left ski is adjusted, and 1½" wider if both skis are adjusted in the manner shown for the left ski in FIG. 5. Thus, if the ski stance in FIG. 4 is 38", then the ski stance is adjusted to 39.5" in FIG. 5 if both skis are adjusted in the manner shown for the left ski in FIG. 5.

The particular mounting point in the series of mounting points selected for mounting the lower radius rod 14 should match that which is selected for the upper radius rod 15. If the holes do not match (e.g., mounting radius rods 14 and 15 to 24a and 26b, respectively), then other adjustments to the suspension must be made, such as adjusting the camber of the ski, using a different length radius rod, etc. If the mounting points match (e.g., mounting radius rods 14 and 15 to 24a and 26a, respectively), then only minor adjustments need be made to other parts of the suspension, such as centering the steering 18.

Although diagrams 4 and 5 show the adjustability of the left side of the suspension, the right side may be a mirror image of the left side. Alternatively, the suspension may be structured such that only one side (either the left or the right) of the suspension is adjustable.

Figure 6:
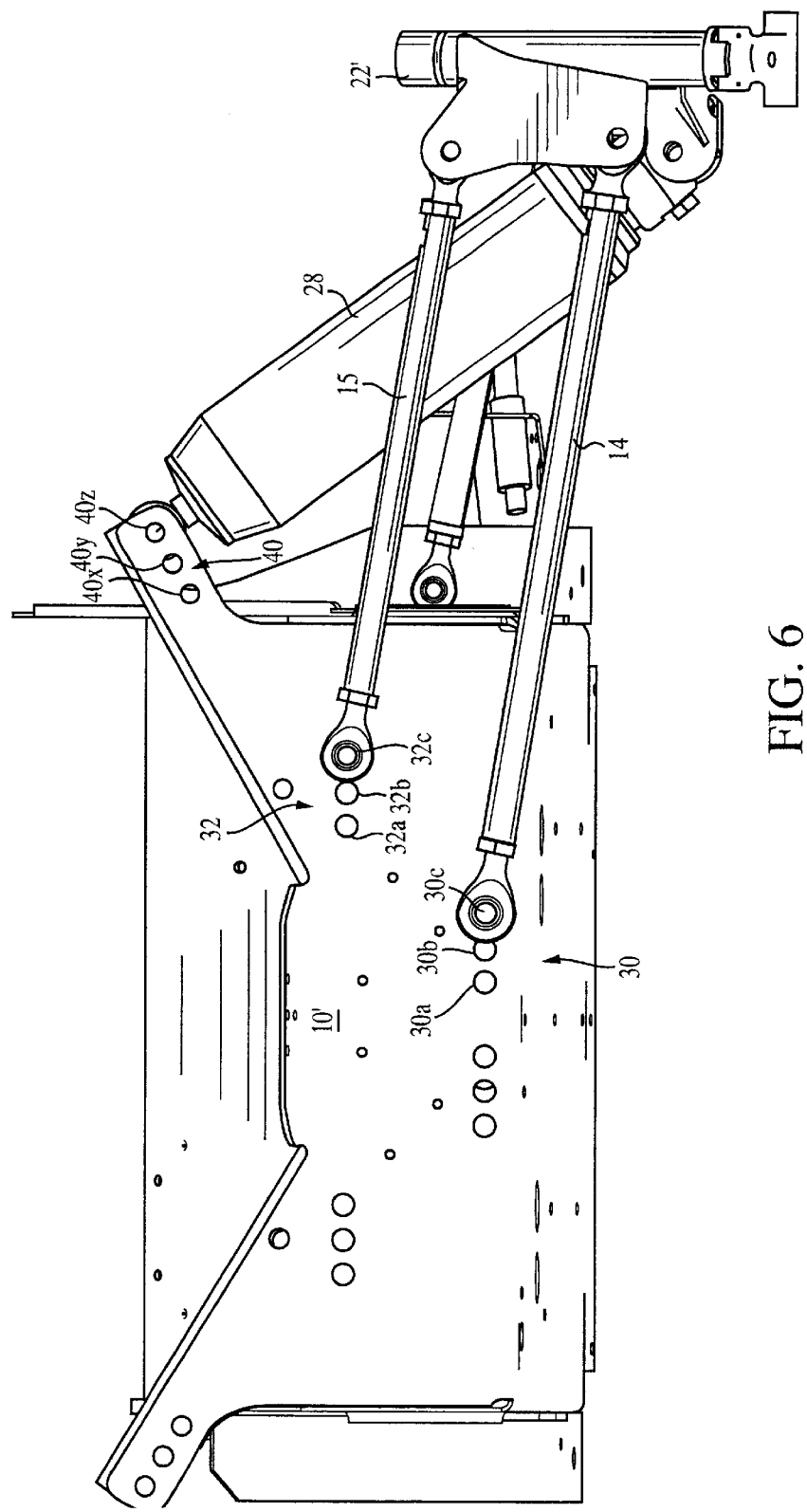
FIG. 6 is a front view of another embodiment of the front suspension of the invention adjusted to a relatively wider width.

Another preferred embodiment of the front suspension of the invention is diagrammed in FIG. 6. This embodiment merely moves the adjustability shown in FIGS. 4 and 5 from the mounting column 22 to the chassis 10'. In FIG. 6, the lateral spacing between the front skis 12 is adjusted to a relatively wider width. The chassis 10', instead of the mounting column 22', has several mounting holes for pivotally mounting the radius rods 14 and 15. In particular, the chassis 10' has a series 30 of three laterally spaced mounting holes 30a, 30b, and 30c for pivotally mounting the lower radius rod 14. In addition, the chassis 10' has a series 32 of three laterally spaced mounting holes 32a, 32b, and 32c for pivotally mounting the upper radius rod 15. With the radius rods 14 and 15 mounted to the outer mounting holes 30c and 32c, respectively, the suspension is adjusted to its relatively wider width. To narrow the ski stance, the bolts through the chassis 10' and the radius rods 14 and 15 may be removed from holes 30c and 32c, respectively, and the mounting column 22' may be shifted laterally inward. The bolts may then be reconnected either through holes 30b and 32b or 30a and 32a and the radius rods 14 and 15.

Figure 7:
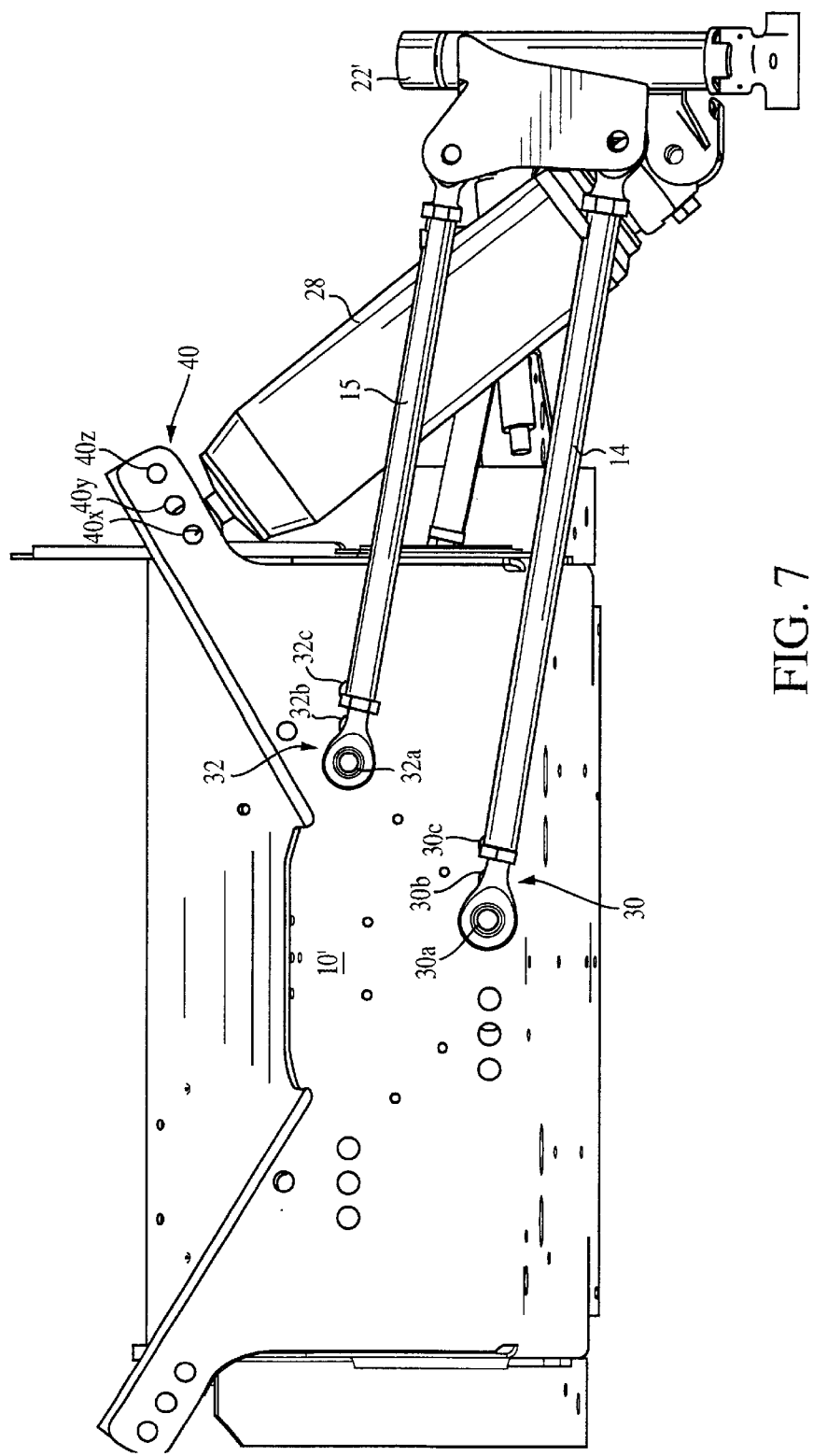
FIG. 7 is a front view of the suspension shown in FIG. 6 adjusted to a relatively narrower width.

FIG. 7 shows the embodiment of FIG. 6 where the suspension is adjusted to a relatively narrow position. The center on center spacing between each of the holes 30a–c, and between each of the holes 32a–c may be ¾" or any other suitable distance. Accordingly, when the front suspension is adjusted from its relatively wider width (as shown in FIG. 6) towards its relatively narrower width (as shown in FIG. 7), the ski stance 16 is adjusted 1½" narrower, if only one ski is adjusted, and 3" narrower if both skis are adjusted in the manner shown for the left ski in FIG. 7. Thus, if the ski stance in FIG. 4 is 41", then the ski stance is adjusted to 38" in FIG. 7 if both skis are adjusted in the manner shown for the left ski in FIG. 7.

The particular mounting point in the series of mounting points selected for mounting the lower radius rod 14 should match that which is selected for the upper radius rod 15. If the holes do not match (e.g., mounting radius rods 14 and 15 to 30a and 32c, respectively), then other adjustments to the suspension must be made, such as adjusting the camber of the ski, using a different length radius rod, etc. If the mounting points match (e.g., mounting radius rods 14 and 15 to 30c and 32c, respectively), then only minor adjustments need be made to other parts of the suspension, such as centering the steering 18 and adjusting the trailing arm 20. In addition, depending upon the shock absorber 28, its mounting might need adjustment.

As shown in FIG. 6, the chassis 10' has a series 40 of mounting holes 40x, 40y, and 40z for pivotally mounting the shock absorber 28. With the radius rods 14 and 15 mounted to the outer mounting holes 30c and 32c, respectively, the suspension is adjusted to its relatively wider width. The shock absorber is correspondingly mounted to the appropriate mounting hole 40z. When the suspension is adjusted to a relatively narrow position, as shown in FIG. 7, the shock absorber is correspondingly mounted to its appropriate mounting hole 40x. The distance between the series 40 of shock absorber mounting holes 40x–z may vary depending upon the geometry of the chassis 10'. Moreover, the appropriate shock mounting hole 40x–40z may also vary depending on the geometry of the chassis and the rest of the front suspension. For instance, the appropriate shock mounting hole for the wider position (shown in FIG. 6) may be 40x instead of 40z. The series of mounting holes 40 need not be located on the chassis 10'. For instance, these mounting holes may instead be located on the other end of the shock absorber, the mounting column 22'. Although the structure for adjusting the shock absorber 28 is diagrammed for the embodiment shown in FIGS. 6 and 7, this same structure may be included on the embodiment shown in FIGS. 4 and 5.

The particular mounting point in the series of mounting points selected for mounting the lower radius rod 14 should match that which is selected for the upper radius rod 15. If the holes do not match (e.g., mounting radius rods 14 and 15 to 30a and 32c, respectively), then other adjustments to the suspension must be made, such as adjusting the camber of the ski, using a different length radius rod, etc. If the mounting points match (e.g., mounting radius rods 14 and 15 to 30c and 32c, respectively), then only minor adjustments need be made to other parts of the suspension, such as centering the steering 18 and possibly adjusting the trailing arm 20. In addition, the mounting of the shock absorber 28 may be adjusted.

Although diagrams 6 and 7 show the adjustability of the left side of the suspension, the right side may be a mirror image of the left side. Alternatively, the suspension may be structured such that only one side (either the left or the right) of the suspension is adjustable.

Note that any number more than two mounting holes may be used for any of the series of holes 24, 26, 30 or 32. In addition, mounting holes 24a–b, 26a–b, 30a–c, and 32a–c need not be holes at all. Persons of average skill in the art will recognize that other equivalent mechanisms may be provided to permit the radius rods to be pivotally mounted to any one of several laterally spaced mounting points or positions on the mounting column or adjacent to the mounting column. For instance, elongated slots or slots with a series of laterally spaced notches may be substituted for the series of holes 24, 26, 30 or 32. Similarly, protruding hooks may also be substituted for holes.

Figure 8:
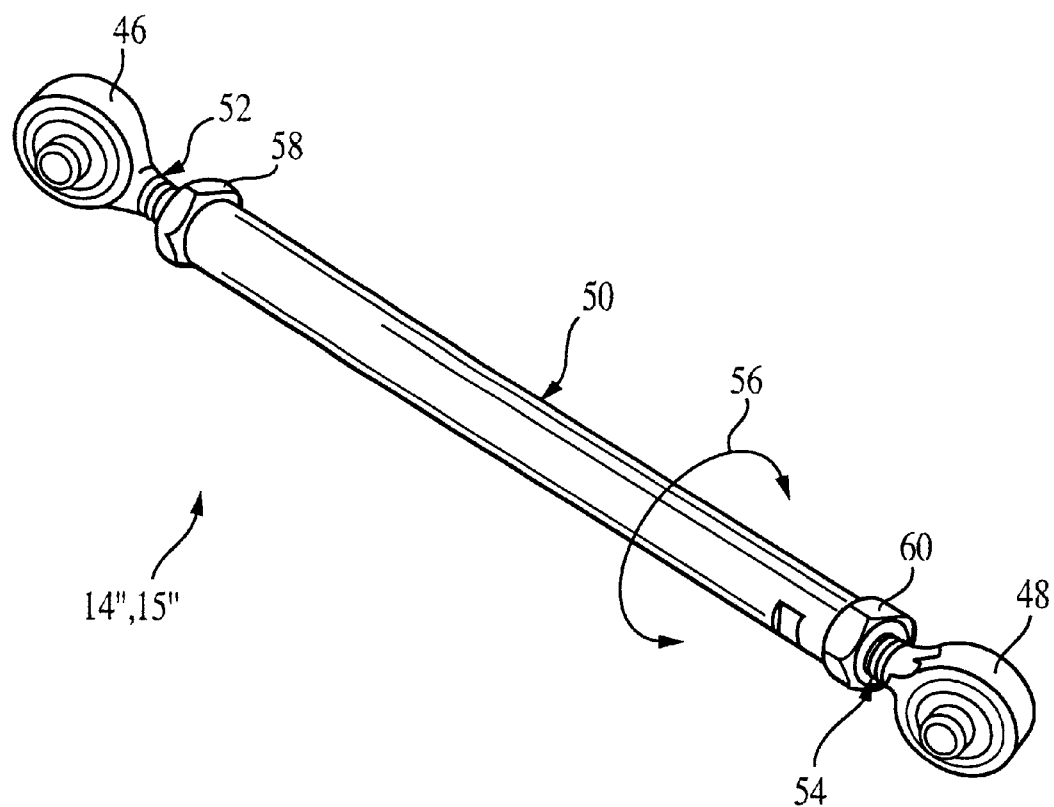
FIG. 8 is a perspective view of a radius rod of yet another preferred embodiment of the front suspension of the invention.

An adjustable length radius rod 14", 15" for use on yet another preferred embodiment of the front suspension of the invention is diagrammed in FIG. 8. Radius rod 14", 15" may be pivotally installed as the lower 14 and upper 15 radius rods between the chassis 10 and the mounting column 22 (as indicated above for other embodiments). However, instead of using a series of mounting points to which the radius rods may be selectively mounted in order to adjust the ski stance 16, adjustable length radius rods 14", 15" are used. Radius rod 14", 15" may be used as radius rods 14 and 15 on the right side, left side, or both sides of the suspension.

Radius rods 14", 15" are preferably comprised of inboard 46 and outboard 48 rod ends and a radial tube 50. The inboard rod end 46 is pivotally connected to the chassis 10, and the outboard rod end is pivotally connected to the mounting column 22. The rod ends 46, 48 are threadably engaged to opposite ends of the tube 50.

Preferably, the rod ends 46, 48 are oppositely threaded. For instance, if the threads 52 on the inboard rod end 46 have right hand threads, then the threads 54 on the outboard rod end 48 have left hand threads. When threaded oppositely in this manner, the length of the radius rod 14", 15" may be readily adjusted by rotating the radial tube 50 in either direction indicated by the double-ended arrow 56 in FIG. 8. Since the oppositely threaded rod ends 46, 48 are pivotally mounted so as not to rotate with the tube 50, the tube's rotation either further engages both rod ends or further disengages both rod ends.

For instance, if threads 52 are right-handed and threads 54 are left-handed (with matching outer threads on opposite ends of tube 50), clockwise rotation (from the perspective of the double-ended arrow 56 in FIG. 8) of the tube 50 will further threadably engage each rod end 46, 48 with tube 50. Thus, clockwise rotation of tube 50 shortens the length of radius rods 14", 15". Conversely, counter-clockwise rotation of tube 50 will further disengage each rod end 46, 48 from tube 50 and lengthen radius rod 14", 15".

Jam nuts 58 and 60 are also threadably engaged with the threads on rod ends 46 and 48, respectively. The jam nuts may be used to secure the engagement between the rod ends and the tube. Before the length of radius rod 14", 15" is adjusted, the jam nuts are screwed away from the ends of the tube to permit the tube's rotation. Once the desired radius rod length is achieved, the jam nuts may be tightened against the ends of the tube to prevent inadvertent adjustment. The rod ends 46, 48 for the upper and lower radius rods must be parallel to their respective mounting surface, as the jam nuts are tightened, in order to permit pivotal movement of the radius rods.

When adjusting the width of either side of the suspension, the length of the radius rods 14", 15" should be adjusted equally. If the length of the radius rods 14", 15" are not adjusted equally, the camber of the spindle and the mounting column 22 and ski 12 will be changed. Once the radius rods 14" and 15" are adjusted equally, then only minor adjustments need be made to other parts of the suspension, such as centering the steering 18.

Persons of average skill in the art will recognize that other equivalent mechanisms may be provided to effect a radius rod of adjustable length. For instance, the radius rods 14 and 15 may extend telescopingly. Similarly, the radius rods may be structured such that only one of the ends adjusts. This may require the removal of one end of the radius rod from its pivotal mountings before the length of the rod may be adjusted.

In addition to the radius rods of adjustable length and the series of laterally spaced mounting points on the chassis or the mounting column, persons of average skill in the art will recognize that other equivalent mechanisms may be provided that perform the function of adjusting the lateral spacing of the front skis.

Several advantages and benefits may be realized with a snowmobile with an adjustable width suspension. Snowmobile purchasers are no longer tied to the type of riding characteristics associated with the fixed width suspension they purchase. Snowmobiles used for trail riding are sold with relatively wider suspensions because they generally provide greater comfort and stability. In contrast, snowmobiles used for racing, off-trail use, mountain climbing, etc. are sold with relatively narrower suspensions, because such narrower suspensions in general allow a rider to lean into turns better. By having an adjustable width suspension, the same suspension may be adjusted for use on trails or a racing track.

A snowmobile with such an adjustable width suspension may also be adjusted to effect an off-center ski stance. For instance, it may be preferable to adjust the left ski inward (narrower) and the right ski outward (wider) for oval-track racing (counter-clockwise). In such use, the rider may be better able to lean to the left into turns while still maintaining stability by having the right ski shifted outward.

A snowmobile with such an adjustable width suspension may also be adjusted to match groomed tracks on snowmobile trails. Snowmobile trails are often groomed (likely by previous riders' tracks) at the width associated with the most common ski stances. A snowmobile rider following such a groomed trail with an uncommon ski stance (either wider or narrower) will not be able to keep both of the snowmobile's skis in the groomed tracks. Instead, the snowmobile will likely fall in and out of the groomed tracks or drift from one ski track to the other, creating a rougher ride. By having an adjustable width front suspension, the suspension may be adjusted to fit in the particular width of the tracks on a groomed trail.

A snowmobile with such an adjustable width suspension may also be adjusted to meet jurisdictional requirements associated with ski stances. Certain countries regulate snowmobile ski stances, requiring them to be of a particular width. With an adjustable width suspension, snowmobile riders can adjust their suspensions to account for a particular country's ski stance regulations.

While a preferred embodiment of the present invention has been described, it should be understood that various changes, adaptations and modifications may be made therein without departing from the spirit of the invention and the scope of the appended claims.

What is claimed is:

1. A snowmobile having an adjustable width front suspension, the snowmobile comprising:
    a chassis;
    left and right front skis spaced laterally from each other; and
    an adjustable width front suspension comprising, for at least one ski:
        a mounting column extending generally upwardly from the at least one ski;
        an upper and a lower rod mounting point on the mounting column;
        an upper and a lower set of rod mounting points on the chassis, the rod mounting points in each set spaced laterally from each other; and
        an upper and a lower radius rod being generally parallel to each other, the lower radius rod being pivotally attached at an outboard end to the lower mounting point on the mounting column and removably pivotally attached at an inboard end to a selected mounting point in the lower set of mounting points on the chassis, the upper radius rod being pivotally attached at an outboard end to the upper mounting point on the mounting column and removably pivotally attached at an inboard end to a selected mounting point in the upper set of mounting points on the chassis, whereby the lateral spacing of the front skis can be adjusted based on which mounting points in the upper and lower sets of laterally spaced mounting points on the chassis are the selected mounting points.

2. The snowmobile of claim 1, wherein the mounting points are holes.

3. The snowmobile of claim 1, wherein the pivot of the upper and lower radius rod guides the mounting column to move generally upwardly with respect to the chassis.

4. The snowmobile of claim 1, further comprising a trailing arm extending rearwardly from the mounting column and pivotally attached at its rearward end to the chassis, the trailing arm allowing generally upward movement of the column with respect to the chassis.

5. The snowmobile of claim 1, wherein the adjustable width front suspension comprises the mounting column, the rod mounting points, and the radius rods for both front skis.

6. The snowmobile of claim 1, wherein the radius rods are bolted to the mounting points.

7. A snowmobile comprising:
    a chassis;
    left and right front skis spaced laterally from each other; and an adjustable width front suspension comprising, for at least one ski:
        a mounting column extending generally upwardly from the at least one ski;
        an upper and a lower set of rod mounting points on the mounting column, the rod mounting points in each set spaced laterally from each other;
        an upper and a lower rod mounting point on the chassis; and
        an upper and a lower radius rod being generally parallel to each other, the lower radius rod being removably pivotally attached at an outboard end to a selected mounting point in the lower set of mounting points on the mounting column and pivotally attached at an inboard end to the lower mounting point on the chassis, the upper radius rod being removably pivotally attached at an outboard end to a selected mounting point in the upper set of mounting points on the mounting column and pivotally attached at an inboard end to the upper mounting point on the chassis, whereby the lateral spacing of the front skis can be adjusted based on which mounting points in the upper and lower sets of laterally spaced mounting points are the selected mounting points.

8. The snowmobile of claim 7, further comprising a shock absorber for the at least one ski mounted between the mounting column and the chassis.

9. The snowmobile of claim 8, further comprising a set of shock mounting points on the mounting column, the shock mounting points in each set spaced laterally from each other, the shock absorber being removably mounted to the mounting column at one of the shock mounting points.

10. The snowmobile of claim 8, further comprising a set of shock mounting points on the chassis, the shock mounting points in each set spaced laterally from each other, the shock absorber being removably mounted to the chassis at one of the shock mounting points.

11. The snowmobile of claim 7, wherein the adjustable front suspension comprises the mounting column, the rod mounting points, and the radius rods for both front skis.

* * * * *